(12) United States Patent
Lien et al.

(10) Patent No.: US 11,789,570 B2
(45) Date of Patent: Oct. 17, 2023

(54) ACTIVE STYLUS

(71) Applicant: EMRight Technology Co., Ltd., Hsinchu County (TW)

(72) Inventors: Chien Chia Lien, Hsinchu County (TW); Ting-Cheng Lai, Hsinchu County (TW)

(73) Assignee: EMRight Technology Co., Ltd., Hsinchu County (TW)

( * ) Notice: Subject to any disclaimer, the term of this patent is extended or adjusted under 35 U.S.C. 154(b) by 0 days.

(21) Appl. No.: 17/837,056

(22) Filed: Jun. 10, 2022

(65) Prior Publication Data

US 2022/0397979 A1 Dec. 15, 2022

(30) Foreign Application Priority Data

Jun. 11, 2021 (TW) .................................. 110121368

(51) Int. Cl.
*G06F 3/044* (2006.01)
*G06F 3/0354* (2013.01)

(52) U.S. Cl.
CPC ........ *G06F 3/0441* (2019.05); *G06F 3/03545* (2013.01)

(58) Field of Classification Search
CPC .... G06F 3/046; G06F 3/03545; G06F 1/1626; G06F 2200/1632; G06F 3/044
See application file for complete search history.

(56) References Cited

U.S. PATENT DOCUMENTS

| | | | | |
|---|---|---|---|---|
| 5,576,502 A * | 11/1996 | Fukushima | ......... | G06F 3/03545 73/862.68 |
| 9,898,103 B2 * | 2/2018 | Stern | ...................... | G06F 3/0383 |
| 10,152,144 B2 * | 12/2018 | Horie | ....................... | G06F 3/046 |
| 10,240,990 B2 * | 3/2019 | Obata | ....................... | G01B 7/003 |
| 10,318,022 B2 * | 6/2019 | Mishalov | ............. | G06F 3/03545 |
| 2014/0306940 A1 * | 10/2014 | Fukushima | .............. | G06F 3/046 345/179 |
| 2016/0209279 A1 * | 7/2016 | Obata | ....................... | G01B 7/14 |
| 2017/0075440 A1 * | 3/2017 | Chang | ................. | G06F 3/03545 |
| 2018/0260048 A1 * | 9/2018 | Chang | ................. | G06F 3/03545 |
| 2020/0064942 A1 | 2/2020 | Chang et al. | | |

FOREIGN PATENT DOCUMENTS

| | | |
|---|---|---|
| TW | 201935197 | 9/2019 |
| TW | M619459 | 11/2021 |

OTHER PUBLICATIONS

"Notice of allowance of Taiwan Counterpart Application", dated Nov. 18, 2022, p. 1-p. 5.

* cited by examiner

*Primary Examiner* — Olga V Merkoulova
(74) *Attorney, Agent, or Firm* — JCIPRNET

(57) ABSTRACT

An active stylus, including a housing, a pen core, a first circuit board, and a touch sensing module, is provided. The pen core, the first circuit board, and the touch sensing module are disposed in the housing. The touch sensing module includes a touch sensing element and a second circuit board. The touch sensing element is disposed on and electrically connected to the second circuit board. The second circuit board is electrically connected to the first circuit board and is abutted to a lateral surface of the first circuit board. The second circuit board is perpendicular to the first circuit board. The pen core is abutted to the touch sensing element.

7 Claims, 3 Drawing Sheets

ACTIVE STYLUS

CROSS-REFERENCE TO RELATED APPLICATION

This application claims the priority benefit of Taiwan application serial no. 110121368, filed on Jun. 11, 2021. The entirety of the above-mentioned patent application is hereby incorporated by reference herein and made a part of this specification.

BACKGROUND

Technical Field

The disclosure relates to an active stylus.

Description of Related Art

As technology advances and develops, various electronic devices on the market use touch panels or touch pads as operating interfaces. Users usually operate on the touch panels with their fingers, however, when sliding with a finger on the touch panel, the friction may be too much due to the large contact area of the finger, which is not suitable for massive or fast input, and may also cause touching by mistake, so the stylus is introduced.

Existing styluses can be divided into active stylus and passive stylus. The active stylus sends signals from the signal transmission circuit inside the pen, so that the corresponding touch panel (or touch pad) determines the coordinates and the contact force of the contacted position after receiving the signal.

Generally speaking, in the existing active styluses, a pen core is pressed against a touch sensing element to generate changes in capacitance value or resistor value, which generates a contact force signal accordingly. Then, the contact force signal is transmitted from the touch sensing element to the main circuit board of the active stylus by a wire, so that the processor on the main circuit board can process, discriminate, or transmit the signal.

However, as the technology of touch sensing elements advances, the amount of information that needs to be transmitted also multiplies, as a result, the above-mentioned wire cannot meet the signal transmission requirement of new touch sensing elements. At the same time, the wire needs to take up a certain space inside the active stylus, and the bridge connection status between the wire and the circuit board also causes the assembly and welding to be difficult or easily damaged during the operation. Therefore, how to improve the electrical connection between the touch sensing element and the main circuit board so as to overcome the above challenges has become a topic of study for persons skilled in the art.

SUMMARY

The disclosure provides an active stylus, which provides a greater amount of information transmission by means of an electrical connection structure between circuit boards, and also provides connection structural strength.

The active stylus of the disclosure includes a housing and a pen core, a first circuit board, and a touch sensing module disposed in the housing. The touch sensing module includes a touch sensing element and a second circuit board. The touch sensing element is disposed on and electrically connected to the second circuit board. The second circuit board is electrically connected to the first circuit board and is abutted to a lateral surface of the first circuit board. The second circuit board is perpendicular to the first circuit board. The pen core is abutted to the touch sensing element.

In an embodiment of the disclosure, the first circuit board has an upper surface and a lower surface opposite to each other. The lateral surface is adjacent between the upper surface and the lower surface. The second circuit board has a front surface and a back surface opposite to each other. The back surface is abutted to the lateral surface. The touch sensing element is disposed on the front surface.

In an embodiment of the disclosure, the active stylus further includes multiple first pads and multiple second pads. The first pads are disposed on the upper surface and the lower surface respectively, and the second pads are disposed on the back surface. The first circuit board and the second circuit board are electrically connected to each other only by welding the first pads onto the second pads respectively.

In an embodiment of the disclosure, electrical signal pins of the first pads include seven of a serial data output (SDO), a serial data input/output (SDA), an input/output power supply (VDD_IO), an empty connection (NC), an interrupt signal 1 (INT1), an interrupt signal 2 (INT2), a power supply (VDD), an input/output ground (GND_IO), a ground (GND), a chip select (CSB), and a clock (SCL/SCLK), and electrical signal pins of the second pads correspond to the electrical signal pins of the first pads.

In an embodiment of the disclosure, each of the first pads maintains a distance relative to the lateral surface.

In an embodiment of the disclosure, a part of the first pads are arranged into a row (R1) on the upper surface, and another part of the first pads are arranged into a row (R2) on the lower surface. The second pads are arranged into a row (R3) and a row (R4) on the back surface. The first pads located in the row (R1) are welded correspondingly onto the second pads located in the row (R3) respectively, and the first pads located in the row (R2) are welded correspondingly onto the second pads located in the row (R4) respectively.

In an embodiment of the disclosure, the row (R1), the row (R2), the row (R3), and the row (R4) are parallel to each other.

In an embodiment of the disclosure, each of the second pads partially overlaps with the lateral surface.

In an embodiment of the disclosure, a pressure receiving direction of the touch sensing element is orthogonal to the front surface, the back surface, and the lateral surface.

In an embodiment of the disclosure, the pen core, the touch sensing element, and the lateral surface of the second circuit board are aligned with each other.

Based on the above, in the active stylus, the second circuit board of the touch sensing module is electrically connected to the first circuit board, and the second circuit board is structurally abutted to the lateral surface of the first circuit board to be perpendicular to each other. The touch sensing element is disposed on the second circuit board and back against the first circuit board, and the pen core is abutted to the touch sensing element. In this way, the component abutting relationship of the pen core, the touch sensing element, the second circuit board, and the first circuit board is formed sequentially in the active stylus. In addition to forming a smooth board-to-board electrical connection, the first and second circuit boards, which are perpendicularly connected to each other can also improve the structural strength. Especially for the touch sensing element, when the pen core is abutted to the touch sensing element, the second circuit board is supported by the first circuit board, so that the entire structure is not deformed or even damaged by the pressing action.

DESCRIPTION OF THE EMBODIMENTS

Figure 1:
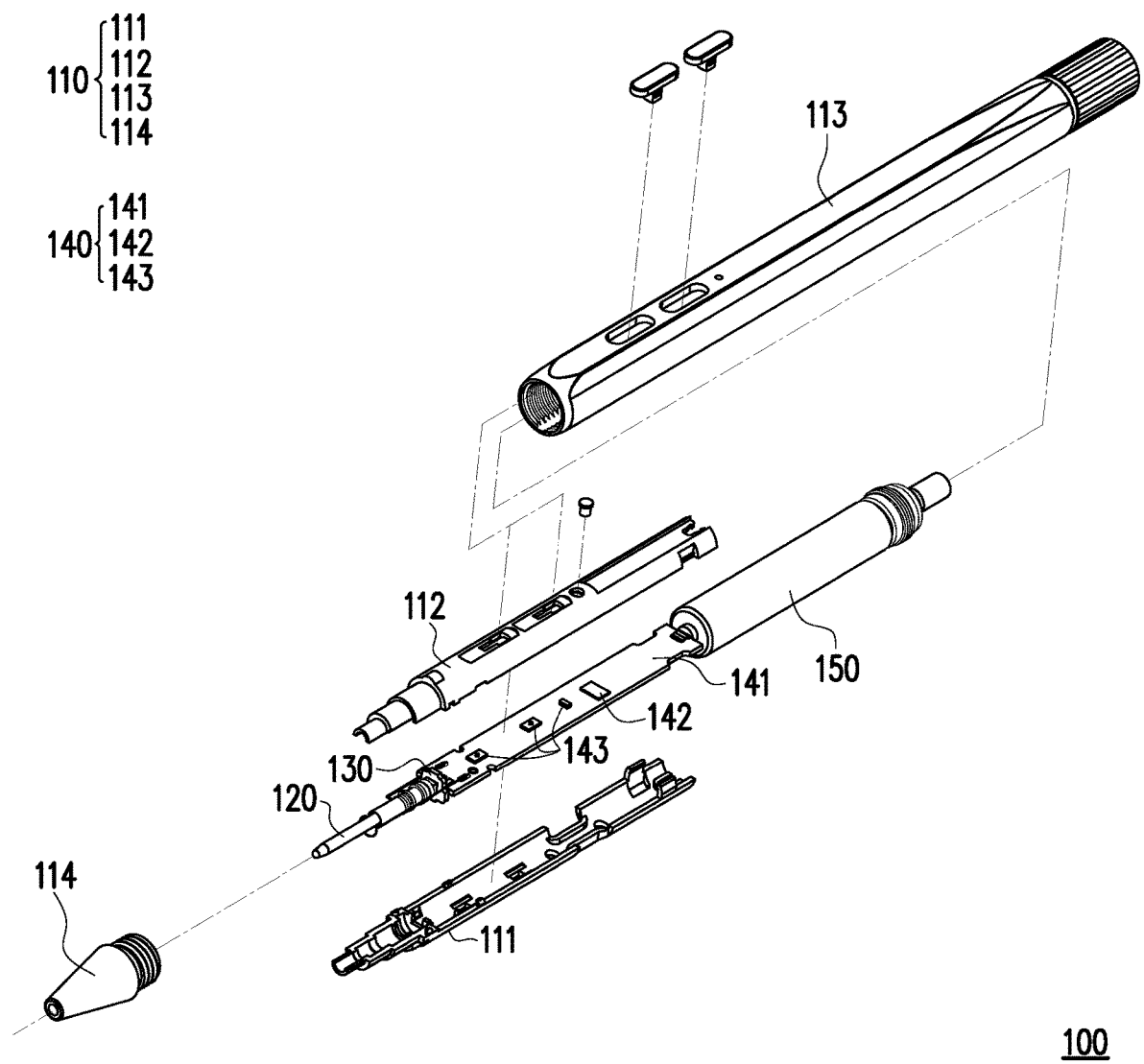
FIG. 1 is an exploded view of an active stylus according to an embodiment of the disclosure.
Figure 2:
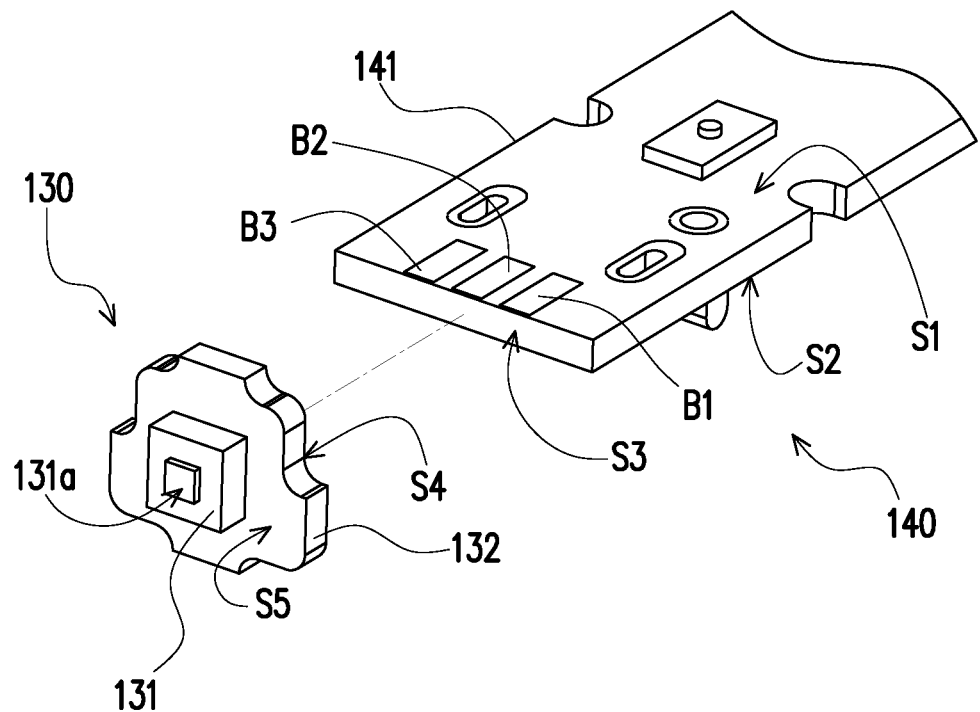
FIG. 2 is a schematic view of an assembly of a touch sensing module and a first circuit board of FIG. 1.

FIG. 1 is an exploded view of an active stylus according to an embodiment of the disclosure. FIG. 2 is a schematic view of an assembly of a touch sensing module and a first circuit board of FIG. 1. Referring to FIG. 1 and FIG. 2 together, in this embodiment, an active stylus 100 includes a housing 110, and a pen core 120, a touch sensing module 130, a control module 140, and a battery 150 disposed in the housing 110. The housing 110 includes a front housing 114, an upper housing 112, a lower housing 111, and a pen barrel 113. One end of the control module 140 is electrically connected to the battery 150, the touch sensing module 130 is electrically connected to the other end of the control module 140. The pen core 120, the touch sensing module 130, and the control module 140 are clamped and fixed by the upper housing 112 and the lower housing 111, and then sleeved by the pen barrel 113. The front housing 114 is then locked to the pen barrel 113, such that the front end of the pen core 120 protrudes from the front housing 114 and is movable along an axial direction to complete the general structural assembly of the active stylus 100.

Furthermore, the control module 140 includes a first circuit board 141, and a processor 142, a switching element 143, and other electronic elements (not shown) disposed thereon. The first circuit board 141 has an upper surface S1, a lower surface S2, and a lateral surface S3. The lateral surface S3 is adjacent between the upper surface S1 and the lower surface S2. The touch sensing module 130 includes a touch sensing element 131 and a second circuit board 132. The second circuit board 132 has a front surface S5 and a back surface S4 opposite to each other. The touch sensing element 131 is disposed on and electrically connected to the front surface S5 of the second circuit board 132, and the touch sensing module 130 is abutted to the lateral surface S3 of the first circuit board 141 with the back surface S4 to complete the electrical connection relationship with the first circuit board 141.

Figure 3:
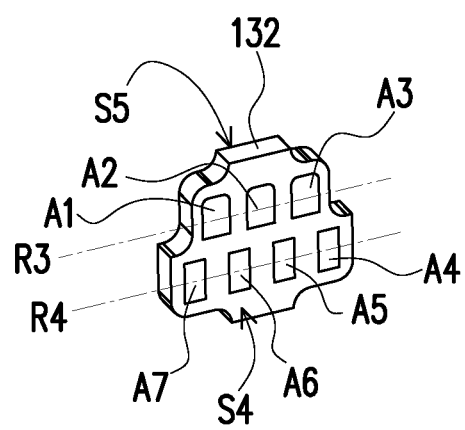
FIG. 3 illustrates the touch sensing module of FIG. 2 from another perspective.

FIG. 3 illustrates the touch sensing module of FIG. 2 from another perspective. Referring to FIG. 1 to FIG. 3 together, in this embodiment, since the second circuit board 132 is abutted to the lateral surface S3 of the first circuit board 141 by the back surface S4 thereof, the first circuit board 141 and the second circuit board 132 are perpendicular (orthogonal) to each other. At the same time, the touch sensing element 131 located on the front surface S5 is substantially back against the first circuit board 141, and the pen core 120 is facing a pressing convex portion 131a of the touch sensing element 131, so that the pen core 120, the touch sensing element 131, and the lateral surface S3 of the first circuit board 141 are aligned with each other inside the active stylus 100. In other words, the orthographic projections of the pen core 120 and the pressing convex portion 131a of the touch sensing element 131 overlap with each other on the lateral surface S3, so that the pressing direction of the pen core 120 to the touch sensing element 131 (equivalent to the pressure receiving direction of the touch sensing element 131) is orthogonal to the front surface S5 and the back surface S4 of the second circuit board 132 and the lateral surface S3 of the first circuit board 141.

In this way, the first circuit board 141 can serve as a structural support for the second circuit board 132, so that the second circuit board 132 is not deformed or even damaged when the touch sensing element 131 is being pressed.

Figure 4:
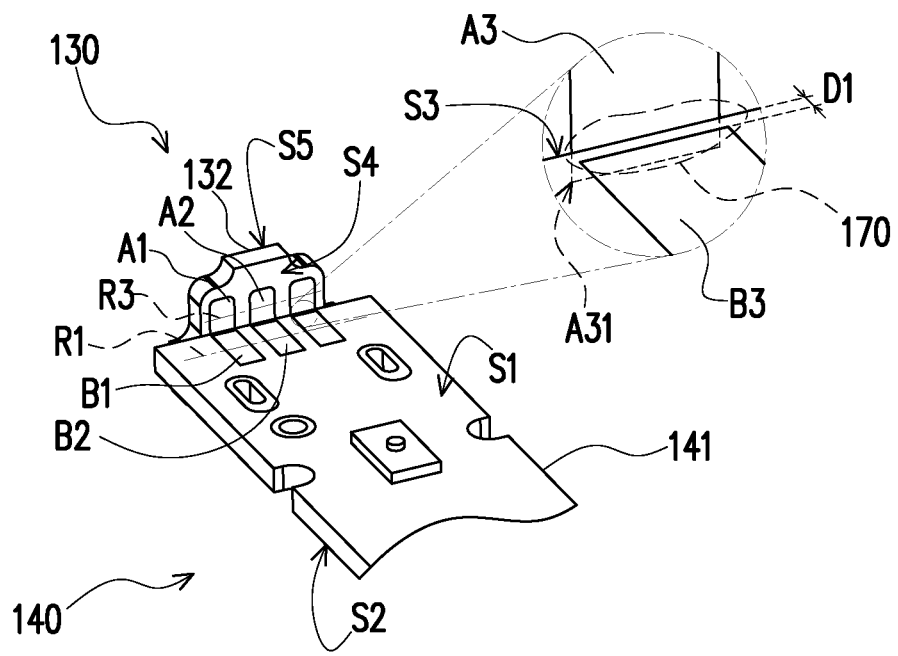
FIG. 4 and FIG. 5 illustrate a corresponding connection status between the first circuit board and the touch sensing module from another perspective.
Figure 5:
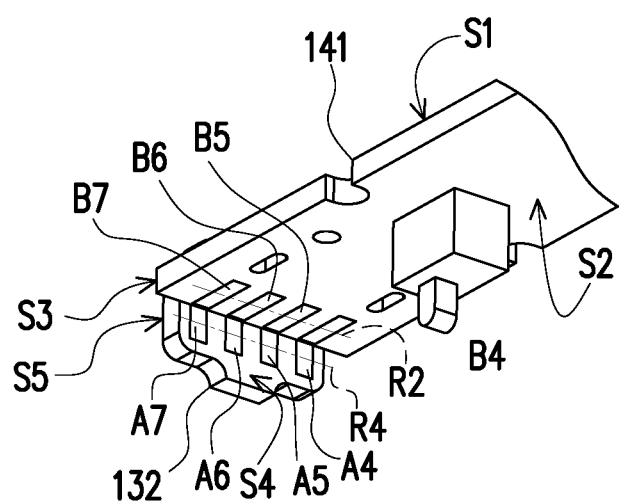

FIG. 4 and FIG. 5 illustrate a corresponding connection status between the first circuit board and the touch sensing module from another perspective. Referring to FIG. 3 to FIG. 5 together, in this embodiment, the active stylus 100 further includes multiple first pads B1 to B7 and multiple second pads A1 to A7. The first pads B1 to B7 are disposed on the upper surface S1 and the lower surface S2 of the first circuit board 141 respectively. The second pads A1 to A7 are all disposed on the back surface S4 of the second circuit board 132. Referring to FIG. 2 to FIG. 5, in this embodiment, the first circuit board 141 and the second circuit board 132 are electrically connected to each other only by welding the first pads B1 to B7 onto the second pads A1 to A7 respectively.

Referring to FIG. 4 and FIG. 5, among the first pads B1 to B7, a part of the first pads B1 to B3 are arranged into a row R1 on the upper surface S1, while the other part of the first pads B4 to B7 are arranged into a row R2 on the lower surface S2. The second pads A1 to A7 are all arranged into rows R3 and R4 on the back surface S4 of the second circuit board 132. The first pads B1 to B3 located in the row R1 are welded correspondingly onto the second pads A1 to A3 located in the row R3 respectively, and the first pads B4 to B7 located in the row R2 are welded correspondingly onto the second pads A4 to A7 located in the row R4 respectively. The row R1, the row R2, the row R3, and the row R4 are parallel to each other.

At the same time, the touch sensing element 131 of this embodiment is a digital output touch sensing element formed by a capacitive MEMS structure, so multiple transmission ends are required to facilitate the transmission of a large amount of information. Accordingly, electrical signal pins of the first pads B1 to B7 of this embodiment include seven of a serial data output (SDO), a serial data input/output (SDA), an input/output power supply (VDD_IO), an empty connection (NC), an interrupt signal 1 (INT1), an interrupt signal 2 (INT2), a power supply (VDD), an input/output ground (GND_I)), a ground (GND), a chip select (CSB), and a clock (SCL/SCLK), while electrical signal pins of the second pads A1 to A7 are consistent corresponding to the electrical signal pins of the first pads B1 to B7.

Referring to FIG. 4 again, for smooth electrical connection between the first circuit board 141 and the second circuit board 132 perpendicular to each other, in this embodiment, each of the first pads B1 to B7 maintains a distance D1 relative to the lateral surface S3, and each of the second pads A1 to A7 partially overlaps with the lateral surface S3, so that the first pads B1 to B7 and the second pads A1 to A7 can be smoothly connected to each other in a one-to-one correspondence through a welding material 170 (FIG. 4 is a partially enlarged view with the first pad B3 and the second pad A3 as an example, the rest of the first pads B1, B2, and B4 to B7, and the second pads A1, A2, and A4 to A7 are also the same, so there will be no repetition). At the same time, short circuit of the first pads B1 to B7 of the same group or the second pads A1 to A7 of the same group is also avoided.

To sum up, in the active stylus of the above embodiments of the disclosure, the second circuit board of the touch sensing module is electrically connected to the first circuit board, and the second circuit board is structurally abutted to the lateral surface of the first circuit board to be perpendicular to each other. The touch sensing element is disposed on the second circuit board and back against the first circuit board, and the pen core is abutted to the touch sensing element, so that the pen core, the force sensing element, and the lateral surface of the first circuit board are aligned with each other, which effectively improves the structural strength. When the pen core is abutted to the touch sensing element, the second circuit board is supported by the first circuit board, so that the entire structure is not deformed or even damaged by the pressing action.

Furthermore, the touch sensing element is a digital output touch sensing element formed by a capacitive MEMS structure, so multiple transmission ends are required to facilitate the transmission of a large amount of information. Therefore, by disposing multiple first pads on the upper surface and the lower surface of the first circuit board, the first pads are one-to-one welded onto multiple second pads on the back surface of the second circuit board. That is to say, during the process of board-to-board perpendicular connection of the disclosure, the pads are welded to each other to complete and meet the requirements of electrical connection.

What is claimed is:

1. An active stylus, comprising:
 a housing;
 a pen core, disposed in the housing;
 a first circuit board, disposed in the housing;
 a touch sensing module, disposed in the housing, wherein the touch sensing module comprises a touch sensing element and a second circuit board, the touch sensing element is disposed on and electrically connected to the second circuit board, the second circuit board is electrically connected to the first circuit board and is abutted to a lateral surface of the first circuit board, the second circuit board is perpendicular to the first circuit board, and the pen core is abutted to the touch sensing element,
 wherein the first circuit board has an upper surface and a lower surface opposite to each other, the lateral surface is adjacent between the upper surface and the lower surface, the second circuit board has a front surface and a back surface opposite to each other, the back surface is abutted to the lateral surface, and the touch sensing element is disposed on the front surface; and
 a plurality of first pads and a plurality of second pads, wherein the first pads are disposed on the upper surface and the lower surface respectively, the second pads are disposed on the back surface, and the first circuit board and the second circuit board are electrically connected to each other only by welding the first pads onto the second pads respectively,
 wherein each of the first pads maintains a distance relative to the lateral surface.

2. The active stylus according to claim 1, wherein electrical signal pins of the first pads comprise seven of a serial data output (SDO), a serial data input/output (SDA), an input/output power supply (VDD_IO), an empty connection (NC), an interrupt signal 1 (INT1), an interrupt signal 2 (INT2), a power supply (VDD), an input/output ground (GND_IO), a ground (GND), a chip select (CSB), and a clock (SCL/SCLK), and electrical signal pins of the second pads correspond to the first pads.

3. The active stylus according to claim 1, wherein a part of the first pads are arranged into a row (R1) on the upper surface, another part of the first pads are arranged into a row (R2) on the lower surface, the second pads are arranged into a row (R3) and a row (R4) on the back surface, the first pads located in the row (R1) are welded correspondingly onto the second pads located in the row (R3) respectively, and the first pads located in the row (R2) are welded correspondingly onto the second pads located in the row (R4) respectively.

4. The active stylus according to claim 3, wherein the row (R1), the row (R2), the row (R3), and the row (R4) are parallel to each other.

5. The active stylus according to claim 1, wherein each of the second pads partially overlaps with the lateral surface.

6. The active stylus according to claim 1, wherein a pressure receiving direction of the touch sensing element is orthogonal to the front surface, the back surface, and the lateral surface.

7. The active stylus according to claim 1, wherein the pen core, the touch sensing element, and the lateral surface are aligned with each other.

* * * * *